Figure 1:
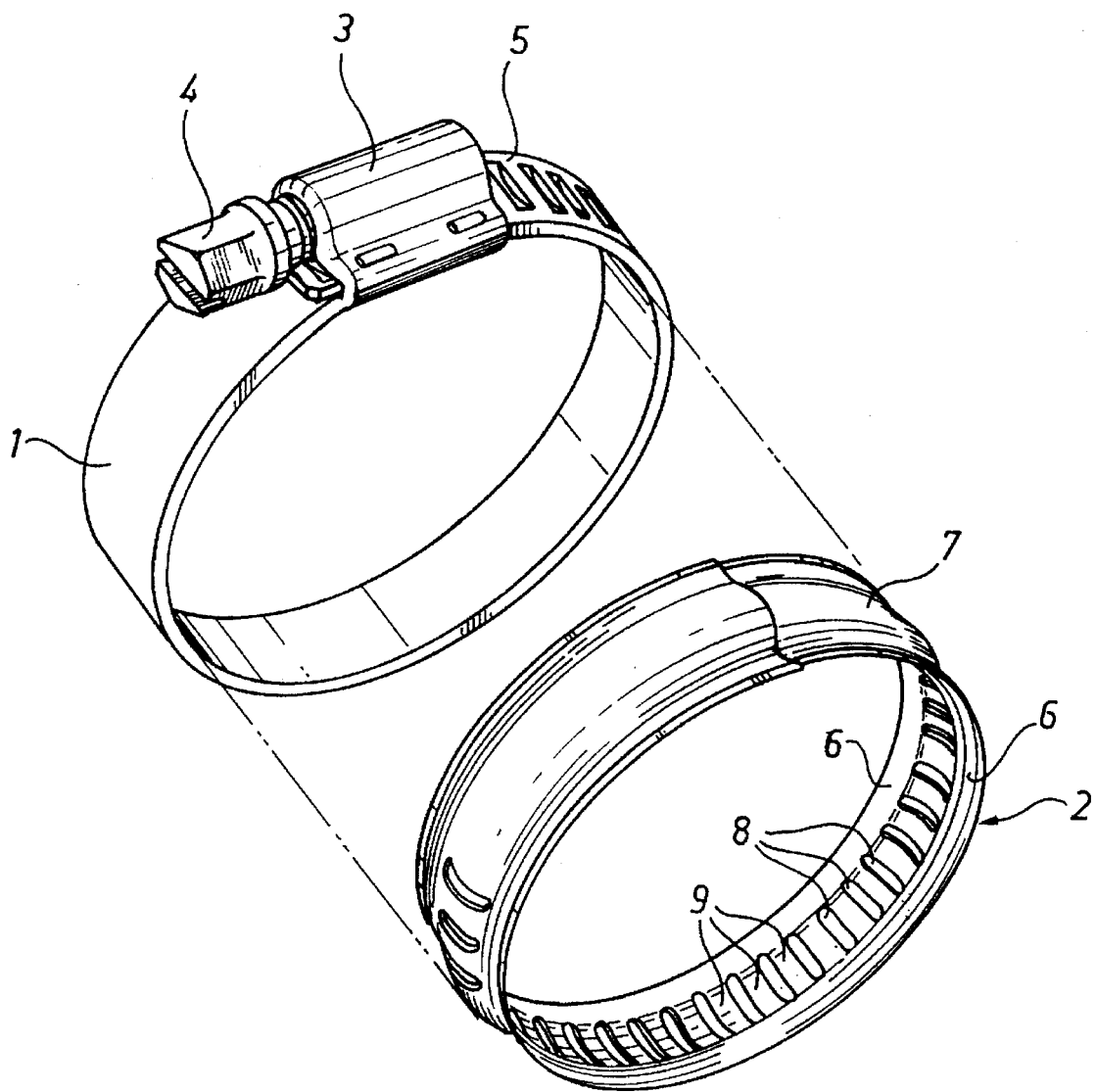

United States Patent
Eliasson

[11] Patent Number: 5,630,255
[45] Date of Patent: May 20, 1997

[54] HOSE CLAMP

[75] Inventor: Roger Eliasson, Bösshult, Sweden

[73] Assignee: ABA of Sweden AB, Anderstorp, Sweden

[21] Appl. No.: 612,867
[22] PCT Filed: Aug. 29, 1994
[86] PCT No.: PCT/SE94/00792
 § 371 Date: Jan. 6, 1996
 § 102(e) Date: Jun. 6, 1996
[87] PCT Pub. No.: WO95/08073
 PCT Pub. Date: Mar. 23, 1995

[30] Foreign Application Priority Data

Sep. 15, 1993 [SE] Sweden ................................ 9302995

[51] Int. Cl.⁶ .................................................. F16L 33/08
[52] U.S. Cl. .......................... 24/274 R; 285/253; 24/279
[58] Field of Search ............................ 24/279 R, 279, 24/279 WB, 20 R, 20 CW, 20 LS, 282, 284; 285/253

[56] References Cited

U.S. PATENT DOCUMENTS

| | | |
|---|---|---|
| 1,699,690 | 1/1929 | Dake . |
| 2,607,092 | 8/1952 | Rubly ................................ 24/279 R |
| 3,233,922 | 2/1966 | Evans ................................ 24/274 R |
| 4,473,928 | 10/1984 | Johnson ............................. 24/279 R X |
| 4,530,524 | 7/1985 | Stephens ........................... 24/279 WB X |
| 4,638,531 | 1/1987 | Ribrant ............................. 24/279 R |
| 4,640,536 | 2/1987 | Printiss, Sr. et al. ............ 24/279 X |
| 4,667,375 | 5/1987 | Enlund .............................. 24/274 R |
| 4,763,695 | 8/1988 | Doolley ............................. 285/253 X |
| 5,234,233 | 8/1993 | Fix .................................... 285/253 X |
| 5,309,607 | 5/1994 | Hohmann et al. ................ 24/279 R |

FOREIGN PATENT DOCUMENTS

| | | |
|---|---|---|
| 0131874 | 1/1985 | European Pat. Off. . |
| 445065 | 5/1986 | Sweden . |

Primary Examiner—Peter M. Cuomo
Assistant Examiner—Robert J. Sandy
Attorney, Agent, or Firm—Cushman Darby & Cushman IP Group of Pillsbury Madison & Sutro

[57] ABSTRACT

The invention concerns an improved hose clamp consisting of an outer annular tightening band (1) which is provided with a tightening device (3, 4), and of a resilient band (2) which extends along the inner face of the tightening band (1). The resilient band is provided with two axially spaced, inwardly directed peripheral beads (6) which extend around the resilient band (2). Intermediate the beads (6) the resilient band (2) is formed with an outwardly directed ridge (7) in abutment against the inner face of the tightening band (1). By means of a number of openings (8), the ridge (7) is divided into a number of bridges (9) which interconnect the beads (6) with one another around the resilient band (2). These bridges (9) are arranged to allow bead movability in the radial as well as axial directions.

1 Claim, 3 Drawing Sheets

HOSE CLAMP

The subject invention concerns an improved hose clamp of the kind consisting of an essentially rigid tightening band which is bent to annular shape with its ends extending in an overlapping position through a tightening device to tighten the hose clamp about an object, such as a hose of an elastic material, and also of a resilient band which is positioned internally of the tightening band, said resilient band being formed with two axially spaced, inwardly directed peripheral beads which extend around the band and with an outwardly projecting ridge intermediate said beads, which ridge abuts against the internal face of the tightening band.

A hose clamp of this kind is known from the Swedish Patent Specification No. 8307152-2. The purpose of this hose clamp is to provide compensation on the one hand for such deformation of the hose material enclosed by the clamp as tends to arise when the hose clamp is tightened about the hose, and on the other for such elasticity deterioration of the hose material that arises as a consequence of material ageing. Practical tests have shown, however, that when used together with some rubber material this prior-art hose clamp fails to serve its intended function, which is due to the fact that the resilient band, owing to its very design, cannot satisfactorily allow any significant movement of the resilient-band beads in the radial and axial directions, and thus full compensation cannot either take place.

The characteristic feature of the invention resides in the provision in said resilient band ridge of a number of openings dividing the ridge into a number of bridges interconnecting said peripheral beads around the circumference of the band, said bridges arranged to impart to said beads some movability radially and also axially. This eliminates the above referred-to drawbacks found in the prior-art hose clamp.

The invention will be described in closer detail in the following with reference to the accompanying drawings, wherein FIG. 1 is a perspective view of the hose clamp in accordance with the invention with the tightening band and the resilient band separated, and FIGS. 2–6 are cross-sectional views through the hose clamp and at the same time a longitudinal view through a portion of a pipe and a hose enclosed by the hose clamp.

The hose clamp in accordance with the invention comprises an outer, non-resilient tightening band 1 which is bent to annular shape, and an inner resilient band 2 which is adapted to be fitted into the tightening band 1. In the drawing figures, the hose clamp is shown equipped with a conventional tightening device comprising a screw worm housing including a screw worm 4 and a threaded portion 5 of the tightening band 1 which passes through the screw worm housing 3 in threaded engagement with the screw worm 4. The tightening band 1 may be tightened about the resilient band 2 with the aid of the screw worm 4.

The resilient band 2 is bent to form a circle, preferably with the band ends overlapping. The resilient band 2 is arranged to be applied to the inner face of the tightening band 1 and is provided with two axially spaced peripheral beads 6 which are directed radially inwards and which extend along the peripheral edges of the resilient band 2. Intermediate the peripheral beads 6 the resilient band 2 forms a radially outwardly projecting ridge 7 which abuts against the inner face of the tightening band 1.

In accordance with the invention, the ridge 7 of the resilient band 2 is divided into bridges 9 which are separated by a number of openings 8. These bridges 9 connect the peripheral bead 6 at one edge of the resilient band 2 with the bead 6 at the opposite band edge around the resilient band 2.

Figure 2:
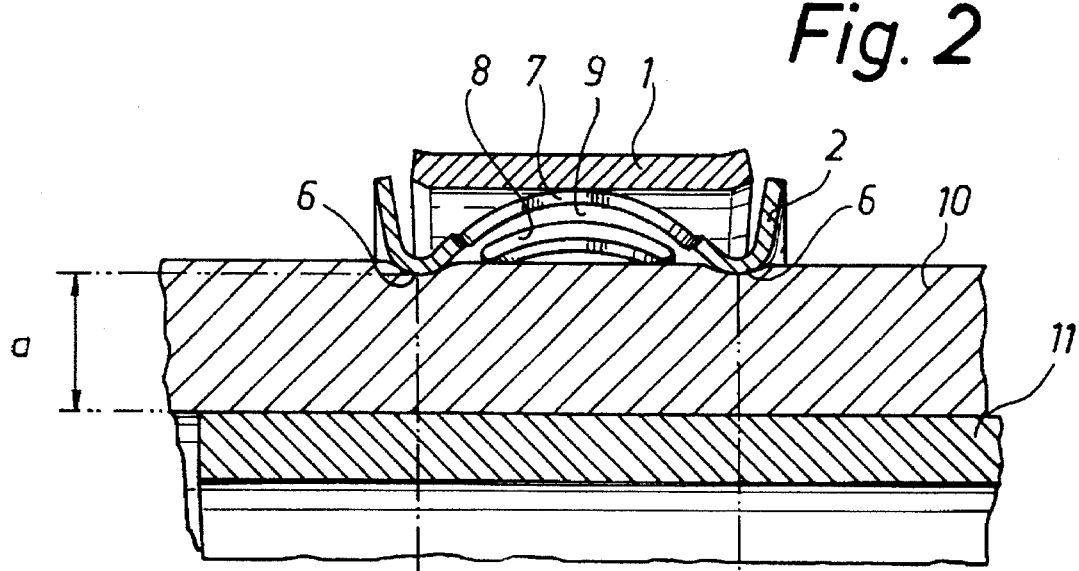

In FIGS. 2–6, the hose clamp is shown mounted about a hose 10 which is applied about the end of a pipe 11. The drawing figures illustrate various stages. FIG. 2 illustrates the hose clamp applied about the hose 10 but not yet tightened. The length dimension a illustrates this situation.

Figure 3:
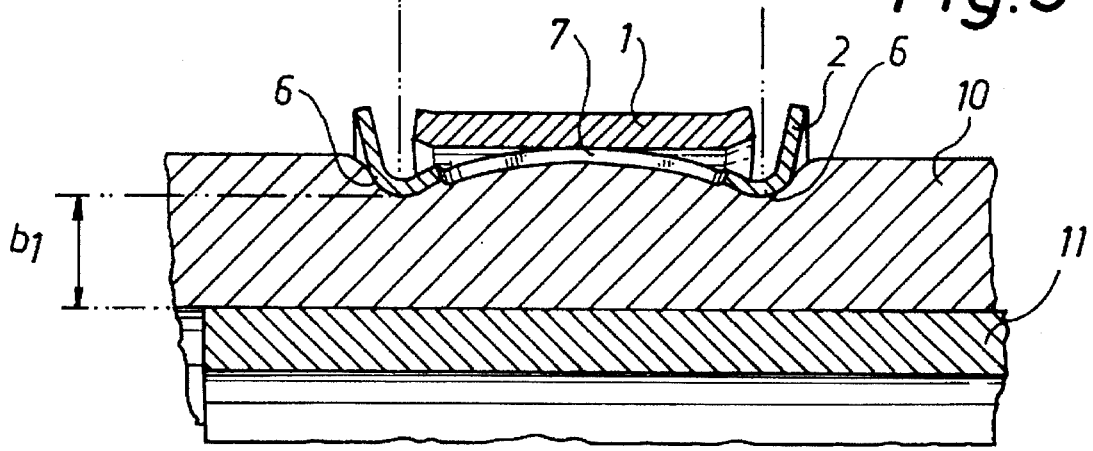
Figure 4:
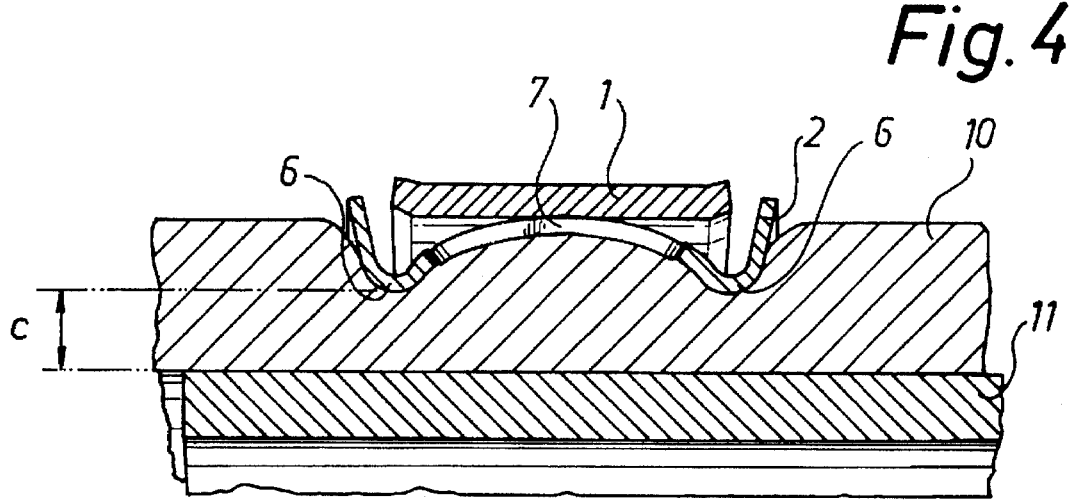

FIG. 3 shows the hose clamp in the position in which it has been tightened about the hose 10. The tightening band 1 then presses the resilient band 2 somewhat down into the elastic hose material, sealing the hose 10 against the pipe 11. This situation is illustrated by means of distance $b_1$ which is shorter than the distance indicated by a in FIG. 2. At the same time distance $b_2$ indicates the distance by which the tightening band 1, owing to the pressure it exerts on the ridge 7, forces the peripheral beads 6 apart somewhat in the axial direction. This resilient movement is made possible because of the provision of the bridges 9 and the intermediate openings 8.

Assuming that some considerable time has elapsed, ageing has caused the elasticity of the material to decrease somewhat. In this case, the resilient band 2 has compensated for the reduction in elasticity and the peripheral beads 6 have penetrated further down into the hose material. This situation is illustrated in the drawing figures by distance c. This compensation effect is made possible owing to the ability of the resilient band 2 to flex radially. In addition, the peripheral beads 6 have again moved closer to one another.

Figure 5:
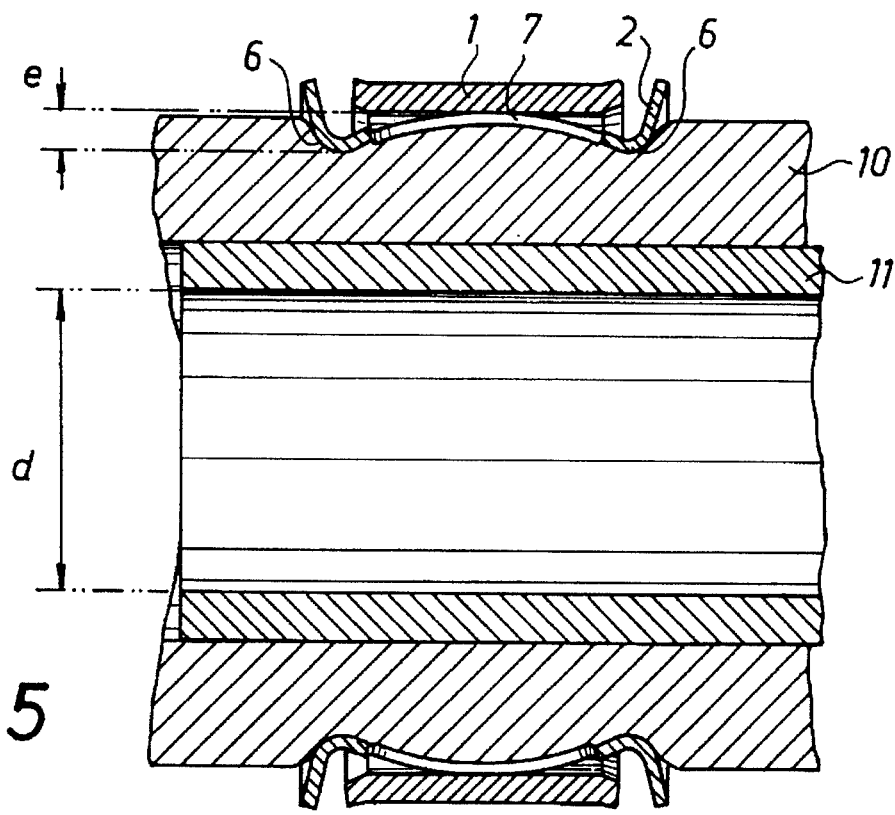
Figure 6:
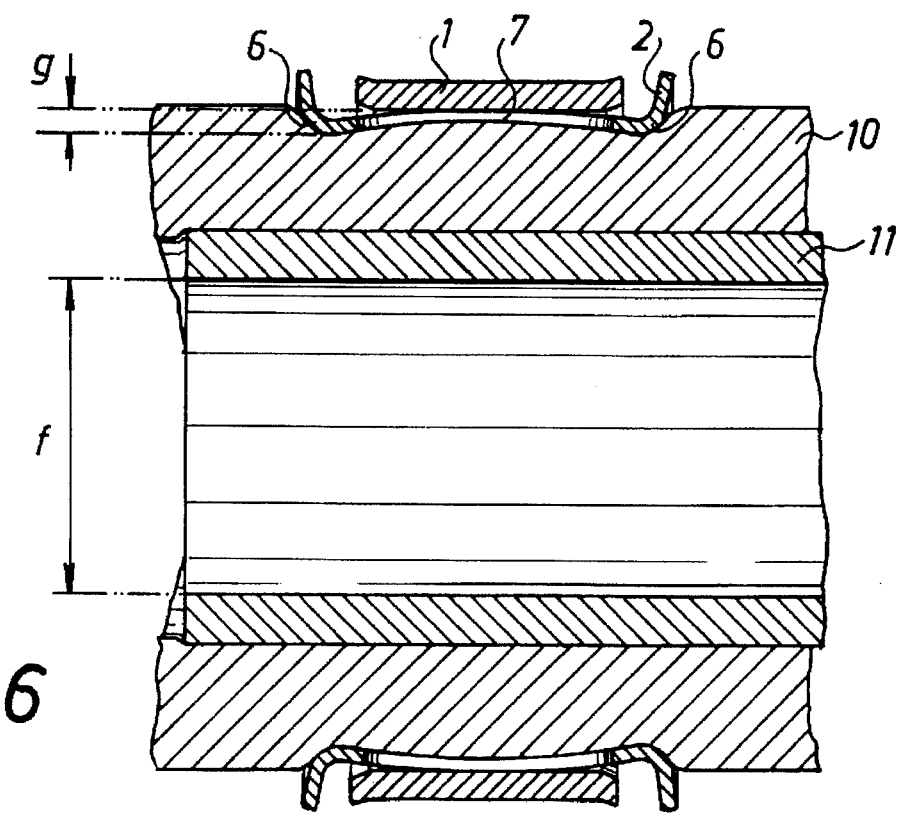

In FIGS. 5 and 6 a portion of the hose 10 and the pipe 11 is shown in a complete cross-sectional view in order to illustrate the clamp hose function under normal operational conditions. The assumption is that periodically a heated medium, such as hot water, flows through the pipe 11. FIG. 5 shows the pipe 11 before it has been heated by the medium. In this situation, the pipe 11 has an inner diameter equalling d. After heating, the pipe 11 has expanded somewhat and in this case its inner diameter equals f, see FIG. 6.

Assuming that at the same time the rigid tightening band 1 is not significantly affected by the hot medium and thus does not expand. In this situation the resilient band 2 of the hose clamp will compensate for the expansion of the pipe 11 by reducing the curvature of the ridge 7 from dimension e indicated in FIG. 5, to dimension g, indicated in FIG. 6.

When the pipe 11 cools, and as a result thereof shrinks somewhat, the resilient band 2 follows the pipe reduction movement by again increasing the curvature of the ridge 7.

Providing a hose clamp with a resilient band in accordance with the invention is advantageous in that automatic post-adjustment of the set position of the hose clamp may be achieved for a comparatively long period of time with consequential reliable sealing of a hose 10 against a pipe 11. Further tightening of the screw 4 afterwards is no longer needed.

The invention is not limited to the embodiment described in the aforegoing and illustrated in the drawings but could be modified in a variety of ways within the scope of the appended claims. Obviously, the resilient band 2 may be used in connection with hose clamps of other types than the tightening device shown in FIG. 1.

I claim:

1. An improved hose clamp consisting of an essentially rigid tightening band (1) which is bent to annular shape with its ends extending in an overlapping position through a tightening device (3, 4) to tighten the hose clamp about an object, such as a hose (10) of an elastic material, and also of a resilient band (2) which is positioned internally of the tightening band (1), said resilient band being formed with two axially spaced, inwardly directed peripheral beads (6) which extend around the resilient band, and also with an outwardly projecting ridge (7) intermediate said beads, said ridge (7) abutting against the internal face of said tightening band (1), characterized by the provision in said resilient band ridge of a number of openings (8) dividing said ridge (7) into a number of bridges (9) interconnecting said peripheral beads (6) around the resilient band, said bridges arranged to impart to said beads some movability radially as well as axially.

* * * * *